US011590651B2

(12) United States Patent
Buerger et al.

(10) Patent No.: US 11,590,651 B2
(45) Date of Patent: Feb. 28, 2023

(54) METHOD AND DEVICE FOR TRAINING MANIPULATION SKILLS OF A ROBOT SYSTEM

(71) Applicant: Robert Bosch GmbH, Stuttgart (DE)

(72) Inventors: Mathias Buerger, Stuttgart (DE); Meng Guo, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 176 days.

(21) Appl. No.: 16/897,795

(22) Filed: Jun. 10, 2020

(65) Prior Publication Data
US 2021/0122036 A1 Apr. 29, 2021

(30) Foreign Application Priority Data

Oct. 28, 2019 (DE) .......................... 102019216560.5

(51) Int. Cl.
*B25J 9/16* (2006.01)
(52) U.S. Cl.
CPC ............. *B25J 9/163* (2013.01); *B25J 9/1664* (2013.01); *B25J 9/1661* (2013.01);
(Continued)
(58) Field of Classification Search
CPC ........ B25J 9/163; B25J 9/1664; B25J 9/1661; B25J 9/1679; B25J 9/1605;
(Continued)

(56) References Cited

U.S. PATENT DOCUMENTS 9,272,418 B1 * 3/2016 Guerin ................... B25J 9/1664
9,977,965 B1 * 5/2018 Parikh ..................... B25J 9/163
(Continued)

FOREIGN PATENT DOCUMENTS

DE     102010029745 A1    12/2011
DE     102014108287 A1    11/2015
(Continued)

OTHER PUBLICATIONS

Abdo, N., et al., "Learning Manipulation Actions from a Few Demonstrations", 2013, IEEE, pp. 1268-1275 (Year: 2013).*
(Continued)

*Primary Examiner* — Abby Y Lin
*Assistant Examiner* — Karston G. Evans
(74) *Attorney, Agent, or Firm* — Norton Rose Fulbright US LLP; Gerard Messina

(57) ABSTRACT

A method of training a robot system for manipulation of objects, the robot system being able to perform a set of skills, wherein each skill is learned as a skill model, the method comprising: receiving physical input from a human trainer, regarding the skill to be learned by the robot; determining for the skill model a set of task parameters including determining for each task parameter of the set of task parameters if a task parameter is an attached task parameter, which is related to an object being part of said kinesthetic demonstration or if a task parameter is a free task parameter, which is not related to a physical object; obtaining data for each task parameter of the set of task parameters from the set of kinesthetic demonstrations, and training the skill model with the set of task parameters and the data obtained for each task parameter.

11 Claims, 4 Drawing Sheets

(52) U.S. Cl.
CPC ............. *G05B 2219/39244* (2013.01); *G05B 2219/39546* (2013.01); *G05B 2219/40116* (2013.01); *G05B 2219/40391* (2013.01)

(58) Field of Classification Search
CPC ........... G05B 2219/40116; G05B 2219/40391; G05B 2219/39025
See application file for complete search history.

(56) References Cited

U.S. PATENT DOCUMENTS

| | | | | |
|---|---|---|---|---|
| 2016/0059412 | A1* | 3/2016 | Oleynik | A47J 36/321 700/250 |
| 2020/0311397 | A1* | 10/2020 | Sawhney | G06F 3/0304 |

FOREIGN PATENT DOCUMENTS

| | | |
|---|---|---|
| DE | 102015100694 A1 | 7/2016 |
| DE | 102017011361 A1 | 6/2018 |
| DE | 102017007908 A1 | 2/2019 |
| DE | 102017216093 A1 | 3/2019 |
| DE | 102019001948 A1 | 9/2019 |
| DE | 202019105752 U1 | 10/2019 |

OTHER PUBLICATIONS

Paxton, C., Kobilarov, M., Hager, G., "Towards RobotTask Planning From Probabilistic Models of Human Skills", 2016, Johns Hopkins University (Year: 2016).*

Kroemer, O., Sukhatme, G., "Feature Selection for Learning Versatile Manipulation Skills based on Observed and Desired Trajectories", 2017, IEEE, pp. 4713-4720 (Year: 2017).*

Wang Z, Garrett C, Kaelbling L, Lozano-Pérez T, "Active model learning and diverse action sampling for task and motion planning," Mar. 2018, ARXIV (Year: 2018).*

Tanwani, Ajay Kumar, et al., "Learning Robot Manipulation Tasks With Task-Parameterized Hidden Semi-Markov Model," IEEE Robotics and Automation Letters, 2016, pp. 1-8.

Zeestraten, Martijn, "Programming by Demonstration on Riemannian Manifolds," PhD Thesis, Department of Informatics, Bioengineering, Robotics, System Engineering, Dibris University of Genova, Anddepartment of Advanced Robotics Istituto Italiano Di Tecnologia, 2017, pp. 1-157.

Calinon Sylvain, "A Tutorial on Task-Parameterized Movement Learning and Retrieval." Intelligent Service Robotics, 9(1), 2016, pp. 1-29.

* cited by examiner

METHOD AND DEVICE FOR TRAINING MANIPULATION SKILLS OF A ROBOT SYSTEM

CROSS REFERENCE

The present application claims the benefit under 35 U.S.C. § 119 of German Patent Application No. DE 102019216560.5 filed on Oct. 28, 2019, which is expressly incorporated herein by reference in its entirety.

FIELD

The present invention relates to a method and device for training a robot system.

BACKGROUND INFORMATION

Robot systems are used for manipulation of objects

Robot manipulation skills such as picking, inserting, and dropping are often hard-coded for a particular task. This however results in poor flexibility and re-usability in case of new scenarios such as different workspaces or varying conditions.

Further, it is conventional to train a robot system with demonstration. Simply recording and replaying a demonstrated trajectory is often insufficient, because changes in the environment, such as varying robot and/or object poses, would render any attempt unsuccessful.

SUMMARY

The present invention provides a method and system with which the learning of new skills and tasks can be implemented in an efficient and easy way.

This may be achieved by example devices and methods according to the present invention.

In accordance with an example embodiment of the present invention, a method of training a robot system, in particular for manipulation of objects, the robot being able to perform a set of skills, wherein each skill is learned as a skill model in particular as a TP-HSMM, Task Parameterized Hidden semi-Markov Model, combined with a TP-GMM, Task Parameterized Gaussian Mixture Model, comprises the steps of:
receiving physical input, in particular from a human trainer, regarding the skill to be learned by the robot, wherein the physical input comprises a set of kinesthetic demonstrations on the robot system;
determining for said skill model a set of task parameters, wherein the step of determining the set of task parameters comprises determining for each task parameter of said set of task parameters if a task parameter is an attached task parameter, which is related to an object being part of said kinesthetic demonstration or if a task parameter is a free task parameter, which is not related to a physical object;
obtaining data for each task parameter of said set of task parameters from the set of kinesthetic demonstrations, and training said skill model with said set of task parameters and said data obtained for each task parameter.

Preferably, a skill is learned as a TP-HSMM, Task Parameterized Hidden semi-Markov Model, combined with a TP-GMM, Task Parameterized Gaussian Mixture Model.

A basic feature of learning from demonstration is to fit a prescribed skill model such as GMMs, Gaussian Mixture Models; to a handful of demonstrations. For each skill, the trainer, in particular a human trainer performs several, in particular a number of $M_a$ kinesthetic demonstrations on the robot. Each demonstration contains $T_m$ data points for a dataset of $N=\Sigma_{m=1}^{M} T_m$ total observations $\xi=\{\xi_t\}_{t=1}^{N}$ where $\xi_t \in \mathbb{R}^d$. Preferably, the demonstrations are recorded from the perspective of P different coordinate systems TP, which are also referred to as the task parameters. For obtaining data for the task parameters the demonstrations are transformed from global frame to frame $p \in TP$, $$\xi_t^{(p)} = T_{(b_t^{(p)}, A_t^{(p)})}^{-1}(\xi_t) = A_t^{(p)^{-1}}(\xi_t - b_t^{(p)}),$$

where $(b_t^{(p)}, A_t^{(p)})$ is the translation and rotation of frame p with regard to a reference frame, in particular the world frame at time t.

A TP-GMM is described by the parameters $$\{\pi_k, \{\mu_k^{(p)}, \Sigma_k^{(p)}\}p \in TP\}_{k=1}^{K}$$

where K represents the number of Gaussian components in the mixture model, $\pi_k$ is the prior probability of each component, and $\mu_k^{(p)}, \Sigma_k^{(p)}$ are mean and covariance of the k-th component within frame p.

Once learned, the TP-GMM can be used during execution to reproduce a trajectory for the learned skill. Namely, given the observed frame $\{(b_t^{(p)}, A_t^{(p)})\}_{p \in TP}$, the learned TP-GMM is converted into one single GMM with parameters $\{\pi_k, \{\mu_{t,k}^{(p)}, \Sigma_{t,k}^{(p)}\}p \in TP\}_{k=1}^{K}$, by multiplying the affine-transformed Gaussian components across different frames, as follows $$(\Sigma_{t,k})^{-1} = \sum_{p \in TP}(\Sigma_{t,k}^{(p)})^{-1}, \mu_{t,k}^{(p)} = \Sigma_{t,k}\sum_{p \in TP}(\Sigma_{t,k}^{(p)})^{-1}\mu_{t,k}^{(p)},$$

where parameters of the updated Gaussian at each frame p are computed $\mu_{t,k}^{(p)} = A_t^{(p)}\mu_k^{(p)} + b_t^{(p)}$ and $\Sigma_{t,k}^{(p)} = A_t^{(p)}\Sigma_k^{(p)}A_t^{(p)^T}$. For more details, reference is made to CALINON Sylvain: "A tutorial on task-parameterized movement learning and retrieval." Intelligent Service Robotics, 9(1):1-29, 2016.

Hidden semi-Markov Models (HSMMs) extend standard hidden Markov Models (HMMs) by embedding temporal information of the underlying stochastic process. That is, while in HMM the underlying hidden process is assumed to be Markov, i.e., the probability of transitioning to the next state depends only on the current state, in HSMM the state process is assumed semi-Markov. This means that a transition to the next state depends on the current state as well as on the elapsed time since the state was entered.

Exemplary details of applying Hidden semi-Markov Models in combination with Task-Parameterized Gaussian Mixture Models (TP-GMMs), for robot skill encoding to learn spatio-temporal features of the demonstrations are described, for example, in the following reference: TANWANI, Ajay Kumar, CALINON Sylvain: "Learning Robot Manipulation Tasks with Task-Parameterized Hidden Semi-Markov Model." IEEE Robotics and Automation Letters, pages 1-8, 2016.

More specifically, a task-parametrized HSMM model consists of the following parameters $$\theta = \{\{a_{kh}\}_{h=1}^{K}, (\mu_k^D, \sigma_k^D), \{\pi_k, \{\mu_k^{(p)}, \Sigma_k^{(p)}\}_{p \in TP}\}\}_{k=1}^{K}$$

where $\alpha_{kh}$ is the transition probability from state k to h; $(\mu_k^D, \sigma_k^D)$ describe the Gaussian distributions for the duration of the state k, i.e., the probability of staying in state k for a certain number of consecutive steps; and $$\{\pi_k, \{\mu_k^{(p)}, \Sigma_k^{(p)}\}_{p \in TP}\}_{k=1}^K$$

is the TP-GMM as described above and for each k, describe the emission probability, i.e., probability of observation, corresponding to state k. The prior $\pi_k$, however, describes in an HSMM only the probability distribution of the initial component at t=1. The probability distribution of the components at subsequent time steps is determined via the underlying Semi-Markov Model. Note that in an HSMM each state corresponds to a Gaussian component in the associated TP-GMM.

Preferably, the structure of the Semi-Markov Model is linear, which means the sequence of states is deterministic and only the duration in each state is probabilistic. This linear structure can be achieved by setting $\pi_k = \delta_{1k}$ and $\alpha_{kh} = \delta_{(k+1)h}$ with $\delta_{ij}=0$ for $i \neq j$ and $\delta_{ij}=1$ for $i=j$. By assuming a linear structure, each skill follows the same segments and is trained in separate model. Preferably, no bifurcations are needed.

Preferably, the aforementioned TP-HSMM formalism is adapted to the Riemannian manifold, for a detailed theory of which reference is made to ZEESTRATEN, Martijn: "Programming by demonstration on Riemannian manifolds." 2017. PhD thesis, Department of Informatics, Bioengineering, Robotics, System Engineering, DIBRIS University of Genova, and Department of Advanced Robotics Istituto Italiano di Tecnologia.

For each skill, the trainer, in particular a human trainer performs several kinesthetic demonstrations on the robot. Each kinesthetic demonstration comprises a sequence of states consisting of states of an end-effector of the robot system and consisting of states of the object being part of the kinesthetic demonstrations.

Particularly, for skill $a \in A$, wherein A is a set of manipulation skills, the set of objects involved is given by $O_a \in O$ and the set of demonstrations is given by $D_a = \{D_1, \ldots D_{Ma}\}$, where each demonstration is given by $$D_m = [s_t]_{t=1}^{Tm} = [(\xi_t \{p_{t,o}, o \in O_a\})]_{t=1}^{Tm},$$

where $D_m$ is a sequence of states s that consists of the robot end-effector state $\xi$ within the manifold $M_\xi$ and object states $\{p_o, o \in O_a\}$ each within the manifold $M_p$. Via a combination of these skills, these objects can be manipulated to reach a desired final state.

According to the present invention, a skill enables the robot system to manipulate an object. In the following it is differentiated between core skills comprising a desired final state of the object and transition skills where the final state of the object can be freely chosen during demonstration.

The set of task parameters of the skill model is essential for the flexibility and generalization of the skill. By this, the characteristics of the demonstration can be learned from different perspectives. According to the present invention, two different types of task parameters are introduced.

On the one hand, task parameters are usually attached to the objects relevant to the skill and constructed from their poses. These are referred to as attached task parameters. An attached task parameter can be constructed from an object pose $p \in M_p$. For instance, for $M_\xi = M_p = \mathbb{R}^3 \times S^3$, the associated task parameter is given by b=p and A=diag(R, I$_3$) where R is the rotation matrix corresponding to the orientation in p.

On the other hand, for transition skills there are however further relevant task parameters that are not related to a physical object. These are referred to as free task parameters. A free task parameter can not be perceived and should be set explicitly by the user or a planning algorithm. The choice determining a parameter being a free task parameters directly influences the outcome of executing transition skills.

The example method according to the present invention enables advantageously to train the robot system with new skills in a general way, as the robot system is able to recognizes and encode the intention behind a demonstration. Therefore, the success rate of a new skill is improved.

Further, the example method according to the present invention enables advantageously to learn new skills without implementing a simulation model.

According to an embodiment, the step of determining the set of task parameters comprises choosing the task parameters among the following: task parameters associated with a pose of the object being part of said kinesthetic demonstration, free task parameters, or task parameters associated with a pose, in particular an initial pose, of and end effector of the robot system. In particular, for a skill a, the set of task parameters, denoted by TP$_a$ can be chosen among the following: the set of relevant objects O$_a$, the set of free task parameters, denoted by F$_a$, and the robot arm initial pose, denoted by r. Generally, the set of tasks parameters can be chosen by attaching frames to all involved objects O$_a$ and to the robot arm initial pose indexed by r as well as using the free task parameters F$_a$ for transition skills, i.e., TP$_a$=O$_a$ $\cup$ F$_a$ $\cup$ \{r\}.

Advantageously, by choosing an appropriate set of task parameters computation cost might be increased and/or performance of reproduction might be decreased.

According to an example embodiment, the step of choosing the task parameters is based on a validation of the reproduction error of said choice. For this we need a ground truth, which is given as demonstration. Usually, the set of demonstrations is rather small, such that the same set of demonstrations Da is used for training and validation. This yields to the validation:

$$V(TP_a) = \sum_{m=1}^{M_a} \sum_{t=1}^{T_m} \|\log_{\xi_t}(\hat{\xi}_t)\|$$

where $\hat{\xi}_t$ is the trajectory retrieved from a skill model for the task parameters TP$_a$ from a demonstration, with M$_a$ is the number of demonstrations wherein each demonstrations contains Tm data points for a dataset of for a dataset of N=$\Sigma_{m=1}^M$ T$_m$ total observations.

In case that the number of involved objects for a skill is small, the model can be trained for all combinations of task parameters and each choice can be validated using the above described validation. If the number of objects is higher, the trainer might preferably preselect some promising choices of task parameters to reduce the computation time.

According to an example embodiment, the method further comprises the step of learning a precondition model of a skill, which refers to a relative relations between the robot system, in particular and end-effector of the robot system, and an object at an initial time. Preferably, the precondition is satisfied when executing a skill to ensure an successful execution. The learned skill model as described above contains information where the robot arm, in particular the end-effector, would start from, but does not incorporate information about the rest of an environment of the robot system, in particular the objects. Such information should include how the objects and the robot arm, in particular the end effector are located with regard to each other when the execution of a specific skill starts. Therefore, according to an example embodiment, a task parameterized Gaussian, TP-G, is learned for each object to fit its poses from the demonstrations. More specifically, the precondition model of a skill is defined by $$\gamma_{1,a}(s, p_F) \triangleq \left\{\left(\mu_{1,o}^{(p)}, \Sigma_{1,o}^{(p)}\right), \forall\, p \in TP_a \setminus \{o\}\right\}_{o \in O_a \cup F_a}$$

where $(\mu_{1,o}^{(p)}, \Sigma_{1,o}^{(p)})$ is the Gaussian distribution of object o's initial pose at time 1 from perspective of object p's initial pose at initial time 1.

Advantageously, the precondition model can be learned purely from the kinesthetic demonstrations performed on the robot system.

According to an example embodiment of the present invention, the method further comprises the step of learning an effect model of skill, which refers to a relative relation between the robot system, in particular, and end-effector of the robot system and an object at a final time. The effect of a skill is the resulting system state after executing the skill, which includes both the poses of robot arm and involved objects. The learned skill model as described above contains information where the robot arm, in particular the end-effector, would stop at, but does not incorporate information about the rest of an environment of the robot system, in particular the objects. Such information should include how the objects and the robot arm, in particular the end effector are located with regard to each other when the execution of a specific skill finishes. Therefore, according to an embodiment a task parameterized Gaussian, TP-G, is learned for each object to fit its poses from the demonstrations. More specifically, the effect model of a skill is defined by $$\gamma_{T,a}(s, p_F) \triangleq \left\{\left(\mu_{T,o}^{(p)}, \Sigma_{T,o}^{(p)}\right), \forall\, p \in TP_a\right\}_{o \in O_a}$$

where $(\mu_{T,o}^{(p)}, \Sigma_{T,o}^{(p)})$ is the Gaussian distribution of object o's final pose at time T from the perspective of object p's initial pose at initial time 1.

Advantageously, the skill model can be learned purely from the kinesthetic demonstrations performed on the robot system.

In practice, different task parameters can be chosen for $\gamma_{1,a}$ and $\gamma_{T,a}$ to incorporate not only relative but also absolute conditions. Preferably, the skill model and/or the precondition model is computed within the object pose manifold $\mathcal{M}_p$.

According to a further embodiment of the present invention, the method comprises the steps of evaluating a measure of the precondition of a skill using the precondition model. In particular, the product of the observation probability for the robot system, in particular the robot arm, and each object, or equivalently the sum for their logarithmic values can be computed. The measure provides a continuous value that evaluates how similar a current situation is to the ones demonstrated during the kinesthetic demonstration. This measure can be already useful in the following ways: it can be compared with a given threshold to decided whether the precondition of skill a is satisfieded, or it can be used to compare different scenarios and different free task parameters in $p_F$, and to decide which one satisfies the precondition more.

According to a further embodiment of the present invention, the method comprises further the step of predicting an effect of a skill using the effect model. This prediction can be useful to predict the effect of a skill which is the resulting system state after executing the skill, which includes both the poses of robot arm and involved objects.

The present invention also includes a robot system configured being trainable via physical input, in particular from a human trainer, regarding the skill to be learned by the robot, wherein the physical input comprises a set of kinesthetic demonstrations on the robot, according a method according to any of the described embodiments.

According to an example embodiment, the method further comprises optimizing the confidence of a skill sequence. A measure of confidence is used to measure how likely it is to perform the skill successfully within a new scenario and/or under new conditions.

According to an example embodiment of the present invention, the robot system is configured to track a reference trajectory with an end-effector of the robot system.

According to an example embodiment of the present invention, the robot system is configured to detect objects of interest.

The present invention also includes a computer for controlling a robot system according to the embodiments, wherein the computer is configured to execute the method according to the embodiments.

The present invention also includes a computer program comprising computer program code, the computer program code when being executed on a computer enabling said computer to perform the method according to the embodiments.

The present invention also includes a machine-readable storage medium comprising the computer program according the embodiments.

The present invention also includes the use of a robot system, in particular for manipulation of objects, the robot being able to perform a set of skills, according to the embodiments for executing a skill sequence comprising a set of skills learned by the robot system according to the method according to any of the embodiments and/or with a computer according to the embodiment and/or with a computer program according to the embodiment.

After determining the optimal choice of free task parameters according to the method described above, a skill sequence is executed as follows. Starting from h=0, the actual system state $s_h$ including the poses of all relevant objects and the robot arm are obtained from the state estimation system such as perception and robot state estimator. Then the associated task parameters are constructed from $s_h$ according to the optimal choice of task parameters used during the training of the skill model. If a skill is a transition skill, the free task parameters associated with the 1 objects can not be obtained from the state estimation system, instead should be set according to the optimal choice as described above. Thus, given the complete set of task parameters, the GMM components can be computed.

The above process is summarized in the following Algorithm 1. The training process between Line 2 to 5 is done offline for each skill a in the set of skills A. During execution, after observing the initial state $s_0$, the optimal task parameter $p_F$ is computed in Lines 6 and 7. Then, each skill is executed as described in Lines 9 to 14, which makes use of the learned models and the optimization results.

Algorithm 1: Optimize Transition Skills for Manipulation Tasks
Input: Set of skills A; demonstration $D_a$ for each a∈A; skill sequence a.
1 for each each a∈A //during training
2 Choose task parameters TPa.
3 Train TP-HSMM model $\theta_a$ in given $TP_a$ and $D_a$.
4 Learn the precondition distribution $\theta 1,a$ in given $TP_{1,a}$ and $D_a$.
5 Learn the system state evolution $\theta T,a$ in given $TP_{T,a}$ and $D_a$.
6 Observe the initial system state $s_0$. //During execution
7 Compute $p*_F$ that maximizes confidence $c_a(s_0, p*_F)$.
8 for each $a_h \in a$ do
9 Observe the current system state $s_h$.
10 if $a_h$ is a transition skill then
11 Set free TPs of a according to $p*_F$.
12 Compute the most-likely sequence k* of states in $\theta_{ah}$.
13 Generate reference trajectory ξ* based on k*.
14 Motion control to track ξ* until the end.

The present invention also includes the use of a robot system, in particular for manipulation of objects, the robot being able to perform a set of skills, for determining a certain sequence of skills comprising at least one transition skill of the set of skills and the at least one core skill of the set of skills, and generating a reference trajectory based in the certain sequence.

Further advantageous embodiments are derived from the following description and the figures.

DETAILED DESCRIPTION OF EXAMPLE EMBODIMENTS

Figure 1:
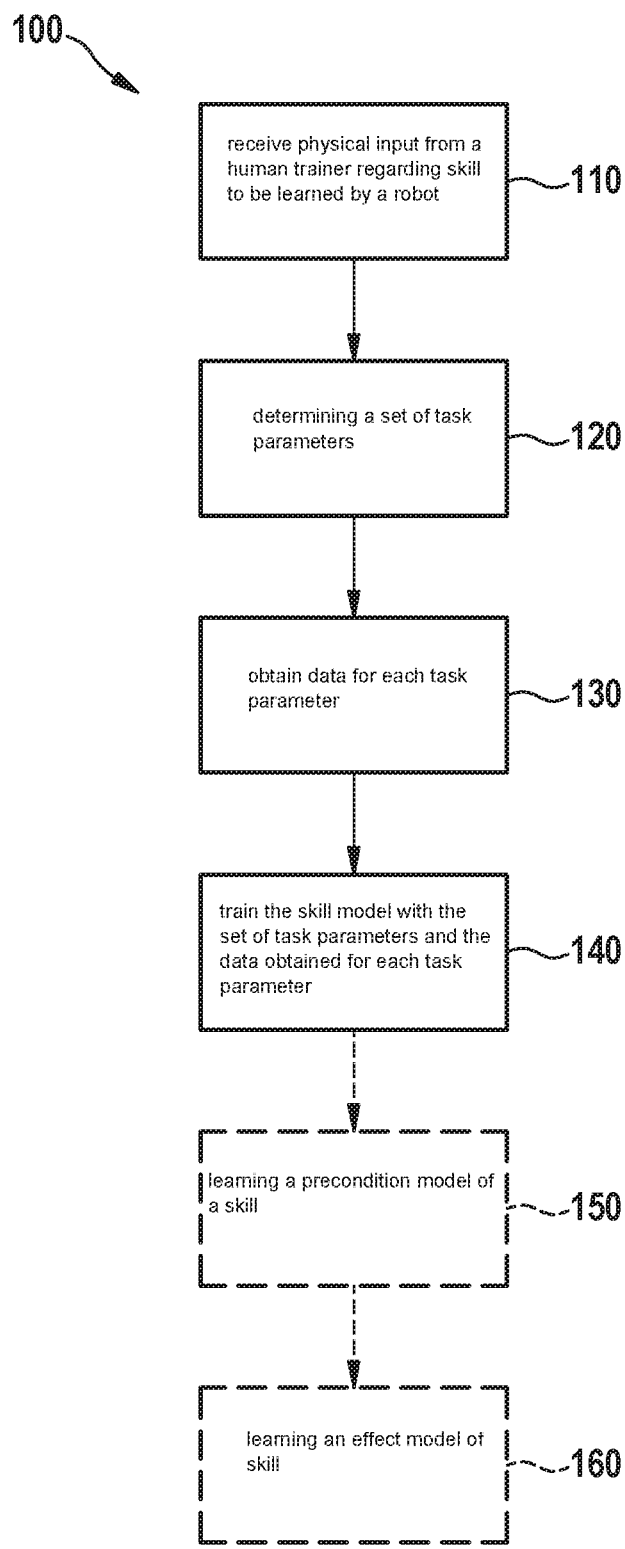
FIG. 1 depicts first aspect of a method of training a robot system according to an example embodiment of the present invention.

FIG. 1 depicts a schematic view of a method 100 of training a robot system 200 according to a first embodiment of the present invention.

The robot system is depicted in a schematic view for example in FIGS. 2a to 2d, and FIG. 3.

The robot system 200 can be used for manipulation of objects. The robot system 200 is configured to perform a set of skills. According to the embodiment, the robot system 200 comprises a gripper and is for example configured to perform a skill "grasp top" as depicted in FIG. 2a which enables the gripper of the robot system to grasp an object 300 at the top of the object 300.

Figure 2A:
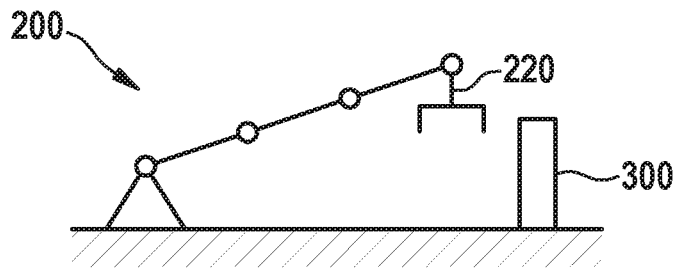
FIGS. 2a to 2d depict different situations of robot systems and an object of interest.
Figure 2B:
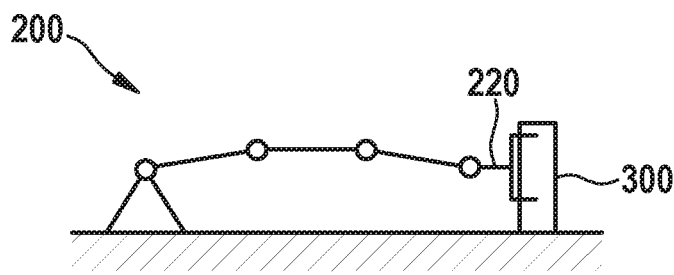
Figure 2C:
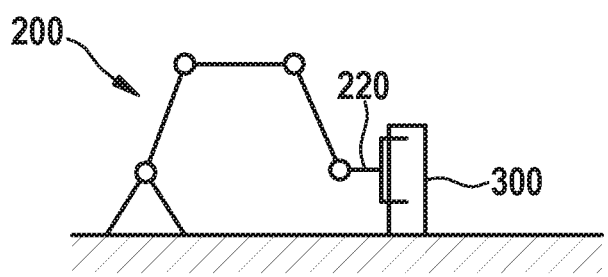
Figure 2D:
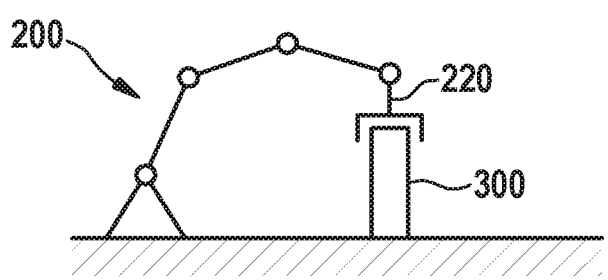

FIG. 2a depicts a situation in which the learned skill "grasp top" results in a poor execution as the object 300 is too far away. Therefore, the situation can be improved by using a transition skill "translate" that pulls the object 300 closer, as shown in FIGS. 2b and 2c, to facilitate the skill "grasp top". In FIG. 2c, the object 300 has reached a position from which the skill "grasp top" can be executed. A method 100 for training the robot system, in order to enable the robot system to decide whether a transition skill is needed and how the transition skill should be executed, for example where the object should be placed using the transition skill "translate" is described with regard to FIG. 1.

According to an example embodiment of the present invention, the method 100 comprises the following steps:
a step 110 of receiving physical input, in particular from a human trainer, regarding the skill to be learned by the robot, wherein the physical input comprises a set of kinesthetic demonstrations on the robot system;
a step 120 of determining for said skill model a set of task parameters, wherein the step of determining the set of task parameters comprises determining for each task parameter of said set of task parameters if a task parameter is an attached task parameter, which is related to an object being part of said kinesthetic demonstration or if a task parameter is a free task parameter, which is not related to a physical object;
a step 130 of obtaining data for each task parameter of said set of task parameters from the set of kinesthetic demonstrations, and
a step 140 of training said skill model with said set of task parameters and said data obtained for each task parameter.

Figure 3:
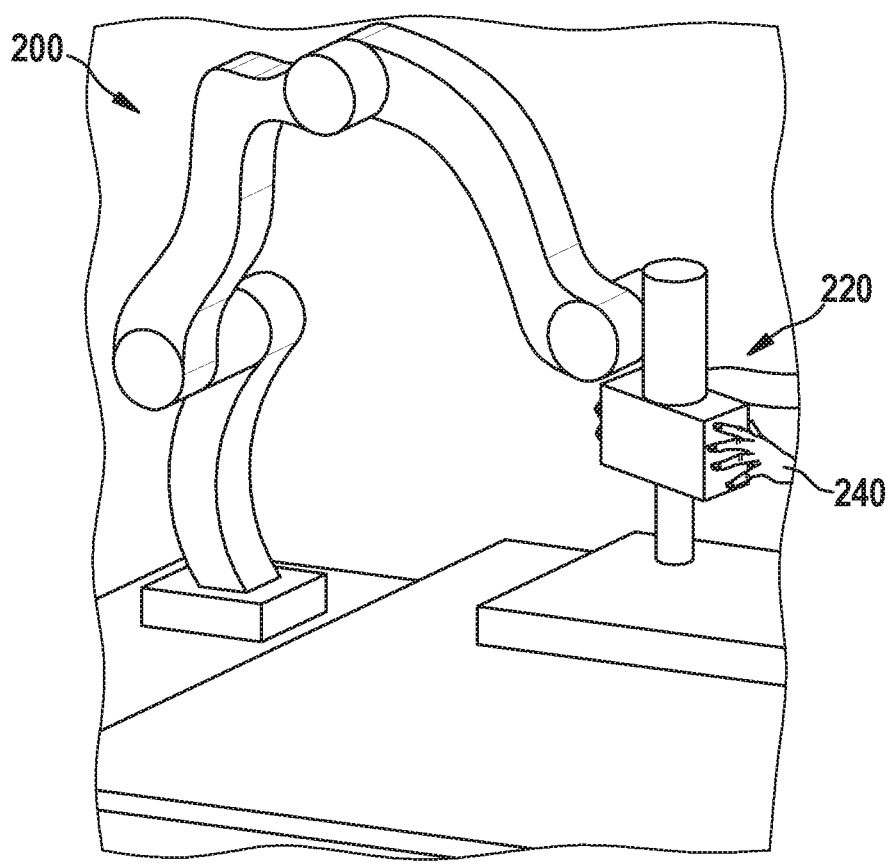
FIG. 3 depicts a robot system in training situation.

According to the example embodiments of the present invention, a kinesthetic demonstration involves the movement of the robot system 200, in particular a robot arm, in particular an end-effector 220, of the robot system 200. FIG. 3 depicts an exemplary training situation. The end-effector 220 of the robot system 200 is moved by kinesthetic demonstration guided by hand 240 of a human trainer.

According to the example embodiments of the present invention, each skill is learned as a skill model, wherein a skill model is preferably learned as a TP-HSMM, Task Parameterized Hidden semi-Markov Model, combined with a TP-GMM, Task Parameterized Gaussian Mixture Model.

The basic feature of learning from demonstration is to fit a prescribed skill model such as GMMs, Gaussian Mixture Models; to a handful of demonstrations. For each skill, the trainer, in particular a human trainer performs several, in particular a number of $M_a$ kinesthetic demonstrations on the robot. Each demonstration contains $T_m$ data points for a dataset of $N=\Sigma_{m=1}^{M} T_m$ total observations $\xi=\{\xi_t\}_{t=1}^{N}$ where $\xi_t \in \mathbb{R}^d$. Preferably, the demonstrations are recorded from the perspective of P different coordinate systems TP, which are also referred to as the task parameters. For obtaining data for the task parameters the demonstrations are transformed from global frame to frame p∈TP, $$\xi_t^{(p)} = T_{(b_t^{(p)}, A_{(t)}^{(p)})}^{-1}(\xi_t) = A_t^{(p)-1}(\xi_t - b_t^{(p)}),$$

where $(b_t^{(p)}, A_t^{(p)})$ is the translation and rotation of frame p with regard to a reference frame, in particular the world frame at time t.

A TP-GMM is described by the parameters $$\{\pi_k, \{\mu_k^{(p)}, \Sigma_k^{(p)}\} p \in TP\}_{k=1}^{K}$$

where K represents the number of Gaussian components in the mixture model, $\pi_k$ is the prior probability of each component, and $\mu_k^{(p)}$, $\Sigma_k^{(p)}$ are mean and covariance of the k-th component within frame p.

Once learned, the TP-GMM can be used during execution to reproduce a trajectory for the learned skill. Namely, given the observed frame $\{(b_t^{(p)}, A_t^{(p)})\}_{p \in TP}$, the learned TP-GMM is converted into one single GMM with parameters $$\{\pi_k, \{\mu_{t,k}^{(p)}, \Sigma_{t,k}^{(p)}\} p \in TP\}_{k=1}^{K},$$

by multiplying the affine-transformed Gaussian components across different frames, as follows $$(\Sigma_{t,k})^{-1} = \sum_{p \in TP} (\Sigma_{t,k}^{(p)})^{-1}, \quad \mu_{t,k} = \Sigma_{t,k} \sum_{p \in TP} (\Sigma_{t,k}^{(p)})^{-1} \mu_{t,k}^{(p)},$$

where parameters of the updated Gaussian at each frame p are computed $\mu_{t,k}^{(p)} = A_t^{(p)} \mu_k^{(p)} + b_t^{(p)}$ and $\Sigma_{t,k}^{(p)} = A_t^{(p)} \Sigma_k^{(p)} A_t^{(p)T}$. For more details, reference is made to CALINON Sylvain: "A tutorial on task-parameterized movement learning and retrieval." Intelligent Service Robotics, 9(1):1-29, 2016.

Hidden semi-Markov Models (HSMMs) extend standard hidden Markov Models (HMMs) by embedding temporal information of the underlying stochastic process. That is, while in HMM the underlying hidden process is assumed to be Markov, i.e., the probability of transitioning to the next state depends only on the current state, in HSMM the state process is assumed semi-Markov. This means that a transition to the next state depends on the current state as well as on the elapsed time since the state was entered.

Exemplary details of applying Hidden semi-Markov Models in combination with Task-Parameterized Gaussian Mixture Models (TP-GMMs), for robot skill encoding to learn spatio-temporal features of the demonstrations are described for example in the following reference: TANWANI, Ajay Kumar, CALINON Sylvain: "Learning Robot Manipulation Tasks with Task-Parameterized Hidden Semi-Markov Model." IEEE Robotics and Automation Letters, pages 1-8, 2016.

More specifically, a task-parametrized HSMM model consists of the following parameters $$\theta = \{\{a_{kh}\}_{h=1}^{K}, (\mu_k^D, \sigma_k^D), \{\pi_k, \{\mu_k^{(p)}, \Sigma_k^{(p)}\}_{p \in TP}\}\}_{k=1}^{K}$$

where $\alpha_{kh}$ is the transition probality from state k to h; $(\mu_k^D, \sigma_k^D)$ describe the Gaussian distributions for the duration of the state k, i.e., the probability of staying in state k for a certain number of consecutive steps; and $$\{\pi_k, \{\mu_k^{(p)}, \Sigma_k^{(p)}\}_{p \in TP}\}_{k=1}^{K}$$

is the TP-GMM as described above and for each k, describe the emission probability, i.e., probability of observation, corresponding to state k. The prior $\pi_k$, however, describes in an HSMM only the probability distribution of the initial component at t=1. The probability distribution of the components at subsequent time steps is determined via the underlying Semi-Markov Model. Note that in an HSMM each state corresponds to a Gaussian component in the associated TP-GMM.

Preferably, the structure of the Semi-Markov Model is linear, which means the sequence of states is deterministic and only the duration in each state is probabilistic. This linear structure can be achieved by setting $\pi_k = \delta_{1k}$ and $\alpha_{kh} = \delta_{(k+1)h}$ with $\delta_{ij}=0$ for $i \neq j$ and $\delta_{ij}=1$ for i=j. By assuming a linear structure, each skill follows the same segments and is trained in separate model. Preferably, no bifurcations are needed.

Preferably, the aforementioned TP-HSMM formalism is adapted to the Riemannian manifold, for a detailed theory of which reference is made to ZEESTRATEN, Martijn: "Programming by demonstration on Riemannian manifolds." 2017. PhD thesis.

For each skill, the trainer, in particular a human trainer performs several kinesthetic demonstrations on the robot. Each kinesthetic demonstration comprises a sequence of states consisting of states of an end-effector of the robot system and consisting of states of the object being part of the kinesthetic demonstrations. During demonstration, the end-effector states and objects states are recorded.

Particularly, for skill $a \in A$, wherein A is a set of manipulation skills, the set of objects involved is given by $O_a \in O$ and the set of demonstrations is given by $D_a = \{D_1, \ldots D_{Ma}\}$, where each demonstration is given by $D_m = [s_t]_{t=1}^{Tm} = [(\xi_t, \{p_{t,o}, o \in O_a\})]_{t=1}^{Tm}$ where $D_m$ is a sequence of states s that consists of the robot end-effector state $\xi$ within the manifold $M_\xi$ and object states $\{p_o, o \in O_a\}$ each within the manifold $M_p$. Via a combination of these skills, these objects can be manipulated to reach a desired final state.

According to the present invention, a skill enables the robot system to manipulate an object. In the following it is differentiated between core skills comprising a desired final state of the object and transition skills where the final state of the object can be freely chosen during demonstration.

The set of task parameters of the skill model is essential for the flexibility and generalization of the skill. By this, the characteristics of the demonstration can be learnt from different perspectives. According to the present invention, two different types of task parameters are introduced.

On the one hand, task parameters are usually attached to the objects relevant to the skill and constructed from their poses. These are referred to as attached task parameters. An attached task parameter can be constructed from an object pose $p \in M_p$. For instance, for $M_\xi = M_p = \mathbb{R}^3 \times S^3$, the associated task parameter is given by b=p and A=diag(R, $I_3$) where R is the rotation matrix corresponding to the orientation in p.

On the other hand, for transition skills there are however further relevant task parameters that are not related to a physical object. These are referred to as free task parameters. A free task parameter can not be perceived and should be set explicitly by the user or a planning algorithm. The choice determining a parameter being a free task parameters directly influences the outcome of executing transition skills.

According to an example embodiment of the present invention, the step 120 of determining the set of task parameters comprises choosing the task parameters among the following: task parameters associated with a pose of the object being part of the kinesthetic demonstration, free task parameters, or task parameters associated with a pose, in particular an initial pose, of and end effector of the robot system. In particular, for a skill a, the set of task parameters, denoted by $TP_a$ can be chosen among the following: the set of relevant objects $O_a$, the set of free task parameters, denoted by $F_a$, and the robot arm initial pose, denoted by r. Generally, the set of task parameters can be chosen by attaching frames to all involved objects $O_a$ and to the robot arm initial pose indexed by r as well as using the free task parameters $F_a$ for transition skills, i.e., $TP_a = O_a \cup F_a \cup \{r\}$.

In case that an object produces irrelevant task parameters, which might increase the computation cost and/or decrease the performance of reproduction, the object frame should not be chosen as task parameter. One problem, which might arise with time-varying task parameters like an object pose is that the TP-HSMM only encodes how the task parameter influences the robot arm motion, but not how the robot arm motion affects the objects pose. For example, while executing the skill, which moves the object the trajectory of the robot arm in the frame, attached to the object is only a single constant point, because the object follows every motion of the robot arm while it is grasped. Thus, the robot arm will follow the object during reproduction, i.e., stay where the object is, since the trajectory generation does not know that the robot arm can be moved freely without leaving the single point component in the object frame. In this case, it is better to not to use the object frame as task parameter According to an example embodiment of the present invention, the step of choosing the task parameters is based on a validation of the reproduction error of the choice. For this, we need a ground truth, which is given as demonstration. Usually, the set of demonstrations is rather small, such that the same set of demonstrations Da is used for training and validation. This yields to the validation:

$$V(TP_a) = \sum_{m=1}^{M_a} \sum_{t=1}^{T_m} \| \log_{\xi_t}(\xi_t) \|$$

where $\xi_t$ is the trajectory retrieved from a skill model for the task parameters $TP_a$ from a demonstration, with $M_a$ is the number of demonstrations wherein each demonstrations contains Tm data points for a dataset of for a dataset of $N = \Sigma_{m=1}^{M} T_m$ total observations.

In case that the number of involved objects for a skill is small, the model can be trained for all combinations of task parameters and each choice can be validated using the above described validation. If the number of objects is higher, the trainer might preferably preselect some promising choices of task parameters to reduce the computation time.

According to an example embodiment of the present invention, the method further comprises the step of learning 150 a precondition model of a skill, which refers to a relative relations between the robot system, in particular and end-effector of the robot system, and an object at an initial time. Preferably, the precondition is satisfied when executing a skill to ensure an successful execution. The learned skill model as described above contains information where the robot arm, in particular the end-effector, would start from, but does not incorporate information about the rest of an environment of the robot system, in particular the objects. Such information should include how the objects and the robot arm, in particular the end effector are located with regard to each other when the execution of a specific skill starts. Therefore, according to an embodiment a task parameterized Gaussian, TP-G, is learned for each object to fit its poses from the demonstrations. More specially, the precondition model of a skill is defined by $$\gamma_{1,a}(s, p_F) \triangleq \{(\mu_{1,o}^{(p)}, \Sigma_{1,o}^{(p)}), \forall p \in TP_a \setminus \{o\}\}_{o \in O_a \cup F_a}$$

where $(\mu_{1,o}^{(p)}, \Sigma_{1,o}^{(p)})$ is the Gaussian distribution of object o's initial pose at time 1 from perspective of object p's initial pose at initial time 1.

Advantageously, the precondition model can be learned purely from the kinesthetic demonstrations performed on the robot system.

According to an example embodiment of the present invention, the method further comprises the step of learning 160 an effect model of skill, which refers to a relative relation between the robot system, in particular, and end-effector of the robot system and an object at a final time. The learned skill model as described above contains information where the robot arm, in particular the end-effector, would stop at, but does not incorporate information about the rest of an environment of the robot system, in particular the objects. Such information should include how the objects and the robot arm, in particular the end effector are located with regard to each other when the execution of a specific skill finishes. Therefore, according to an embodiment a task parameterized Gaussian, TP-G, is learned for each object to fit its poses from the demonstrations. More specifically, the effect model of a skill is defined by $$\gamma_{T,a}(s, p_F) \triangleq \{(\mu_{T,o}^{(p)}, \Sigma_{T,o}^{(p)}), \forall p \in TP_a\}_{o \in O_a}$$

where $(\mu_{T,o}^{(p)}, \Sigma_{T,o}^{(p)})$ is the Gaussian distribution of object o's final pose at time T from the perspective of object p's initial pose at initial time 1.

Advantageously, the skill model can be learned purely from the kinesthetic demonstrations performed on the robot system.

In practice, different task parameters can be chosen for $\gamma_{1,a}$ and $\gamma_{T,a}$ to incorporate not only relative but also absolute conditions. Preferably, the skill model and/or the precondition model is computed within the object pose manifold $\mathcal{M}_p$.

The present invention also includes a robot system 200 configured being trainable via physical input, in particular from a human trainer, regarding the skill to be learned by the robot system 200, wherein the physical input comprises a set of kinesthetic demonstrations on the robot, according a method 100 according to any of the described embodiments.

According to an example embodiment of the present invention, the robot system 200 is configured to track a trajectory with an end-effector of the robot system. Preferably, during demonstration, the trajectory of the end-effector of the robot system can be fetched for example with a control module of the robot system—

According to an example embodiment of the present invention, the robot system 200 is configured to detect objects 300 of interest. For example, the robot system comprises a camera module for detecting the objects 300. Preferably, during demonstration, the task parameters associated with the objects are detect with a camera module of the robot system 200.

Figure 4:
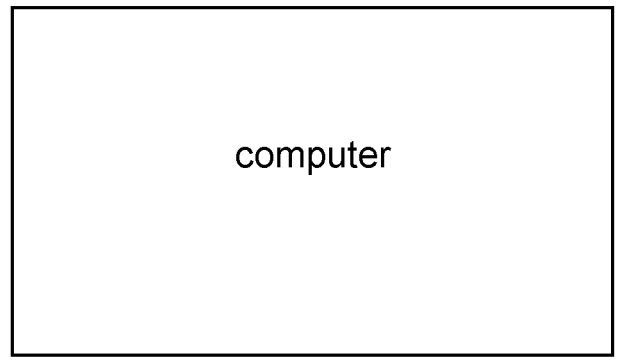
FIG. 4 shows a computer in accordance with an example embodiment of the present invention.

The present invention also includes a computer (FIG. 4) for controlling a robot system 200 according to the embodiments, wherein the computer (FIG. 4) is configured to execute the method 100 according to the embodiments.

The present invention also includes a computer program comprising computer program code, the computer program code when being executed on a computer enabling the computer to perform the method 100 according to the embodiments.

Figure 5:
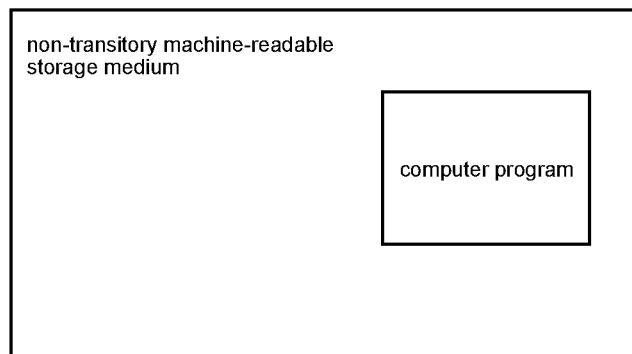
FIG. 5 shows a non-transitory machine-readable storage medium in accordance with an example embodiment of the present invention.

The present invention also includes a machine-readable storage medium (FIG. 5) comprising the computer program (see FIG. 5) according the embodiments.

The present invention also includes the use of a robot system 200, in particular for manipulation of objects 300, the robot system 200 being able to perform a set of skills, according to the embodiments for executing a skill sequence comprising a set of skills learned by the robot system according to the method according to any of the embodiments and/or with a computer according to the embodiment and/or with a computer program according to the embodiment.

After determining the optimal choice of free task parameters according to the method described above, a skill sequence is executed as follows. Starting from h=0, the actual system state $s_h$ including the poses of all relevant objects and the robot arm are obtained from the state estimation system such as perception and robot state estimator. Then the associated task parameters are constructed from $s_h$ according to the optimal choice of task parameters used during the training of the skill model. If a skill is a transition skill, the free task parameters associated with the 1 objects can not be obtained from the state estimation system, instead should be set according to the optimal choice as described above. Thus, given the complete set of task parameters, the GMM components can be computed.

The above process is summarized in the following Algorithm 1. The training process between Line 2 to 5 is done offine for each skill a in the set of skills A. During execution, after observing the initial state $s_0$, the optimal task parameter $p_F$ is computed in Lines 6 and 7. Then, each skill is executed as described in Lines 9 to 14, which makes use of the learned models and the optimization results.

Algorithm 1: Optimize Transition Skills for Manipulation Tasks

Input: Set of skills A; demonstration $D_a$ for each a∈A; skill sequence a.
1 for each each a∈A //during training
2 Choose task parameters TPa.
3 Train TP-HSMM model $\theta_a$ in given $TP_a$ and $D_a$.
4 Learn the precondition distribution $\theta 1,a$ in given $TP_{1,a}$ and $D_a$.
5 Learn the system state evolution $\theta T,a$ in given $TP_{T,a}$ and $D_a$.
6 Observe the initial system state $s_0$. //During execution
7 Compute $p*_F$ that maximizes confidence $c_a(s_o, p*_F)$.
8 for each $a_h \in a$ do
9 Observe the current system state $s_h$.
10 if $a_h$ is a transition skill then
11 Set free TPs of a according to $p*_F$.
12 Compute the most-likely sequence k* of states in $\theta_{a_h}$.
13 Generate reference trajectory $\xi*$ based on k*.
14 Motion control to track $\xi*$ until the end.

The present invention also includes the use of a robot system 200, in particular for manipulation of objects, the robot system 200 being able to perform a set of skills, for determining a certain sequence comprising at least one transition skill of the set of skills and the at least one core skill of the set of skills, and generating a reference trajectory based on the certain sequence.

What is claimed is:

1. A method of training a robot system for manipulation of an object, the robot system being trained to perform a set of skills for the manipulation of the object, wherein each of the skills is learned as a skill model, the skill model being a TP-HSMM, Task Parameterized Hidden semi-Markov Model, combined with a TP-GMM, Task Parameterized Gaussian Mixture Model, the method comprising the following steps:

for each skill of the set of skills:
receiving physical input from a human trainer regarding the skill to be learned by the robot, wherein the physical input includes a set of kinesthetic demonstrations on the robot system;
determining for the skill model of the skill a set of task parameters including determining for each of the task parameters of the set of task parameters if the task parameter is an attached task parameter, which is related to an object being part of the kinesthetic demonstration, or if the task parameter is a free task parameter, which is not related to a physical object, wherein in the determining, when the skill is a transition skill, at least one of the set of task parameters for the skill model is determined to be a free task parameter which is explicitly set by a user and directly influences an outcome of the transition skill;
obtaining data for each of the task parameters of the set of task parameters from the set of kinesthetic demonstrations; and
training the skill model with the set of task parameters and the data obtained for each of the task parameters;
wherein the set of skills includes at least one core skill and at least one transition skill, each core skill includes a desired final state of the object and each transition skill is a skill where a final state of the object is freely chosen during the demonstrations; and
wherein the method further includes:
determining a sequence of the skills, the sequence including the at least one core skill and the at least one transition skill, the sequence being for the manipulation of the object, and
generating a reference trajectory based on the sequence; and
wherein the method further includes:
learning a precondition model of each skill, wherein the precondition model is defined by:

$$\gamma_{1,\alpha}(s,p_F) \triangleq \{(\mu_{1,o}^{(p)}, \Sigma_{1,o}^{(p)}), \forall p \in TP_\alpha \backslash \{o\}\}_{o \in O_\alpha \cup F_\alpha}$$

where $(\mu_{1,o}^{(p)}, \Sigma_{1,o}^{(p)})$ is a Gaussian distribution at initial time 1;
wherein $\alpha$ is the skill, $O_a$ are task parameters for objects that are relevant for the skill, $F_a$ are the free parameters for the skill, $TP_a$ are all task parameters, s is a current state of the robot system from which the skill is started, $p_F$ is a value for the free task parameters, o is either a task parameter for the objects that are relevant for the skill or a free parameter for the skill, and p is one of the task parameters excluding o.

2. The method according to claim 1, wherein the step of determining the set of task parameters includes choosing task parameters from among the following: (i) task parameters associated with a pose of the object being part of the kinesthetic demonstration, or (ii) free task parameters, or (iii) task parameters associated with an initial pose of an end effector of the robot system.

3. The method according to claim 2, wherein the step of choosing the task parameters is based on a validation of a reproduction error of the choice.

4. The method according to claim 1, wherein the skill is learned as a TP-HSMM, Task Parameterized Hidden semi-Markov Model, combined with a TP-GMM, Task Parameterized Gaussian Mixture Model.

5. The method according to claim 1, the method further comprising the following step:
  learning an effect model of the skill which refers to a relative relation between the robot system and end-effector of the robot system, and an object at a final time.

6. A robot system trainable via physical input from a human trainer, regarding a set of skills to be learned by the robot system for manipulation of an object, wherein each skill is learned as a skill model, the robot system configured to:
  for each skill of the set of skills:
    receive physical input from a human trainer regarding the skill to be learned by the robot, wherein the physical input includes a set of kinesthetic demonstrations on the robot system;
    determine for the skill model of the skill a set of task parameters including determining for each of the task parameters of the set of task parameters if the task parameter is an attached task parameter, which is related to an object being part of the kinesthetic demonstration, or if the task parameter is a free task parameter, which is not related to a physical object, wherein in the determining, when the skill is a transition skill, at least one of the set of task parameters for the skill model is determined to be a free task parameter which is explicitly set by a user and directly influences an outcome of the transition skill;
    obtain data for each of the task parameters of the set of task parameters from the set of kinesthetic demonstrations; and
    train the skill model with the set of task parameters and the data obtained for each of the task parameters;
  wherein the set of skills includes at least one core skill and at least one transition skill, each core skill includes a desired final state of the object and each transition skill is a skill where a final state of the object is freely chosen during the demonstrations; and
  wherein the robot system is further configured to:
    determine a sequence of the skills, the sequence including the at least one core skill and the at least one transition skill, the sequence being for the manipulation of the object, and
    generate a reference trajectory based on the sequence; and
  wherein the robot system is further configured to:
    learn a precondition model of each skill, which refers to a relative relations between robot system and end-effector of the robot system, and an object at an initial time, wherein the precondition model is defined by:

$\gamma_{1,\alpha}(s,p_F) \triangleq \{(\mu_{1,o}^{(p)}, \Sigma_{1,o}^{(p)}), \forall p \in TP_\alpha \backslash \{o\}\}_{o \in O_\alpha \cup F_\alpha}$ where $(\mu_{1,o}^{(p)}, \Sigma_{1,o}^{(p)})$ is a Gaussian distribution at initial time 1;
    wherein α is the skill, $O_a$ are task parameters for objects that are relevant for the skill, $F_a$ are the free parameters for the skill, $TP_a$ are all task parameters, s is a current state of the robot system, and $p_F$ is a value for the free task parameters, o is either a task parameter for the objects that are relevant for the skill or a free parameter for the skill, and p is one of the task parameters excluding o.

7. The robot system according to claim 6, wherein the robot system is configured to track the reference trajectory with an end-effector of the robot system.

8. The robot system according to claim 6, wherein the robot system is configured to detect objects of interest.

9. A computer for controlling a robot system of manipulation of an object, the robot system being trained to perform a set of skills for the manipulation of the object, wherein each of the skills is learned as a skill model, the skill model being a TP-HSMM, Task Parameterized Hidden semi-Markov Model, combined with a TP-GMM, Task Parameterized Gaussian Mixture Model, the computer configured to:
  for each skill of the set of skills:
    receive physical input from a human trainer regarding the skill to be learned by the robot, wherein the physical input includes a set of kinesthetic demonstrations on the robot system;
    determine for the skill model a set of task parameters including determining for each of the task parameters of the set of task parameters if the task parameter is an attached task parameter, which is related to an object being part of the kinesthetic demonstration, or if the task parameter is a free task parameter, which is not related to a physical object, wherein in the determining, when the skill is a transition skill, at least one of the set of task parameters for the skill model is determined to be a free task parameter which is explicitly set by a user and directly influences an outcome of the transition skill;
    obtain data for each of the task parameters of the set of task parameters from the set of kinesthetic demonstrations; and
    train the skill model with the set of task parameters and the data obtained for each of the task parameters;
  wherein the set of skills includes at least one core skill and at least one transition skill, each core skill includes a desired final state of the object and each transition skill is a skill where a final state of the object is freely chosen during the demonstrations; and
  wherein the computer is further configured to:
    determine a sequence of the skills, the sequence including the at least one core skill and the at least one transition skill, the sequence being for the manipulation of the object, and
  generate a reference trajectory based on the sequence; and
  wherein the computer is further configured to:
    learn a precondition model of each skill, which refers to a relative relations between robot system and end-effector of the robot system, and an object at an initial time, wherein the precondition model is defined by:

$\gamma_{1,\alpha}(s,p_F) \triangleq \{(\mu_{1,o}^{(p)}, \Sigma_{1,o}^{(p)}), \forall p \in TP_\alpha \backslash \{o\}\}_{o \in O_\alpha \cup F_\alpha}$ where $(\mu_{1,o}^{(p)}, \Sigma_{1,o}^{(p)})$ is a Gaussian distribution at initial time 1;
    wherein α is the skill, $O_a$ are task parameters for objects that are relevant for the skill, $F_a$ are the free parameters for the skill, $TP_a$ are all task parameters, s is a current state of the robot system, and $p_F$ is a value for the free task parameters, o is either a task parameter for the objects that are relevant for the skill or a free parameter for the skill, and p is one of the task parameters excluding o.

10. A non-transitory machine-readable storage medium on which is stored a computer program for training a robot system for manipulation of an object, the robot system being able to perform a set of skills for the manipulation of the object, wherein each of the skills is learned as a skill model, the skill model being a TP-HSMM, Task Parameterized Hidden semi-Markov Model, combined with a TP-GMM, Task Parameterized Gaussian Mixture Model, the computer program, when executed by a computer, causing the computer to perform the following steps:
for each skill of the set of skills:
receiving physical input from a human trainer regarding a skill to be learned by the robot, wherein the physical input includes a set of kinesthetic demonstrations on the robot system;
determining for the skill model of the skill a set of task parameters including determining for each of the task parameters of the set of task parameters if the task parameter is an attached task parameter, which is related to an object being part of the kinesthetic demonstration, or if the task parameter is a free task parameter, which is not related to a physical object, wherein in the determining, when the skill is a transition skill, at least one of the set of task parameters for the skill model is determined to be a free task parameter which is explicitly set by a user and directly influences an outcome of the transition skill;
obtaining data for each of the task parameters of the set of task parameters from the set of kinesthetic demonstrations; and
training the skill model with the set of task parameters and the data obtained for each of the task parameters;
wherein the set of skills includes at least one core skill and at least one transition skill, each core skill includes a desired final state of the object and each transition skill is a skill where a final state of the object is freely chosen during the demonstrations; and
wherein the method further includes:
determining a sequence of the skills, the sequence including the at least one core skill and the at least one transition skill, the sequence being for the manipulation of the object, and
generating a reference trajectory based on the sequence; and
wherein the method further comprises:
learn a precondition model of each skill, which refers to a relative relations between robot system and end-effector of the robot system, and an object at an initial time, wherein the precondition model is defined by:

$\gamma_{1,\alpha}(s,p_F) \triangleq \{(\mu_{1,o}^{(p)}, \Sigma_{1,o}^{(p)}), \forall p \in TP_\alpha \backslash \{o\}\}_{o \in O_\alpha \cup F_\alpha}$ where $(\mu_{1,o}^{(p)}, \Sigma_{1,o}^{(p)})$ is a Gaussian distribution at initial time 1;
wherein $\alpha$ is the skill, $O_a$ are task parameters for objects that are relevant for the skill, $F_a$ are the free parameters for the skill, $TP_a$ are all task parameters, s is a current state of the robot system, and $p_F$ is a value for the free task parameters, o is either a task parameter for the objects that are relevant for the skill or a free parameter for the skill, and p is one of the task parameters excluding o.

11. A method of using a robot system for manipulation of objects, the method comprising the following steps:
providing the robot system;
training the robot system for manipulation of an object, the robot system being trained to perform a set of skills for the manipulation of the object, wherein each of the skills is learned as a skill model, the skill model being a TP-HSMM, Task Parameterized Hidden semi-Markov Model, combined with a TP-GMM, Task Parameterized Gaussian Mixture Model, the robot system being trained to perform the set of skills by:
for each skill of the set of skills
receiving physical input from a human trainer regarding the skill to be learned by the robot, wherein the physical input includes a set of kinesthetic demonstrations on the robot system;
determining for the skill model for the skill a set of task parameters including determining for each of the task parameters of the set of task parameters if the task parameter is an attached task parameter, which is related to an object being part of the kinesthetic demonstration, or if the task parameter is a free task parameter, which is not related to a physical object, wherein in the determining, when the skill is a transition skill, at least one of the set of task parameters for the skill model is determined to be a free task parameter which is explicitly set by a user and directly influences an outcome of the transition skill;
obtaining data for each of the task parameters of the set of task parameters from the set of kinesthetic demonstrations; and
training the skill model with the set of task parameters and the data obtained for each of the task parameters;
wherein the set of skills includes at least one core skill and at least one transition skill, each core skill includes a desired final state of the object and each transition skill is a skill where a final state of the object is freely chosen during the demonstrations; and
determining a sequence of the skills, the sequence including the at least one core skill and the at least one transition skill, the sequence being for the manipulation of the object; and
performing, by the robot system, the determined sequence including the at least one core skill and the at least one transition skill, the sequence being for the manipulation of the object; and
wherein the method further comprises:
learning a precondition model of each skill, which refers to a relative relations between robot system and end-effector of the robot system, and an object at an initial time, wherein the precondition model is defined by:

$\gamma_{1,\alpha}(s,p_F) \triangleq \{(\mu_{1,o}^{(p)}, \Sigma_{1,o}^{(p)}), \forall p \in TP_\alpha \backslash \{o\}\}_{o \in O_\alpha \cup F_\alpha}$ where $(\mu_{1,o}^{(p)}, \Sigma_{1,o}^{(p)})$ is a Gaussian distribution at initial time 1;
wherein $\alpha$ is the skill, $O_a$ are task parameters for objects that are relevant for the skill, $F_a$ are the free parameters for the skill, $TP_a$ are all task parameters, s is a current state of the robot system, and $p_F$ is a value for the free task parameters, o is either a task parameter for the objects that are relevant for the skill or a free parameter for the skill, and p is one of the task parameters excluding o.

* * * * *